(12) United States Patent
Kim et al.

(10) Patent No.: US 10,408,297 B2
(45) Date of Patent: Sep. 10, 2019

(54) ENGINE MOUNT HAVING BRACKET COUPLING HOOK

(71) Applicants: Hyundai Motor Company, Seoul (KR); Kia Motors Corporation, Seoul (KR)

(72) Inventors: Seung-Won Kim, Seoul (KR); Hyo-Seok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/818,317

(22) Filed: Nov. 20, 2017

(65) Prior Publication Data
US 2019/0072151 A1    Mar. 7, 2019

(30) Foreign Application Priority Data
Sep. 1, 2017    (KR) .......................... 10-2017-0112010

(51) Int. Cl.
| *F16F 9/00* | (2006.01) |
| *F16F 13/10* | (2006.01) |
| *B60K 5/12* | (2006.01) |

(52) U.S. Cl.
CPC .......... *F16F 13/103* (2013.01); *B60K 5/1208* (2013.01); *F16F 13/10* (2013.01)

(58) Field of Classification Search
CPC .. F16F 13/08; F16F 13/10; F16F 13/18; F16F 13/26; F16F 13/103
USPC ........ 267/140.11–140.15; 248/562, 565, 566
See application file for complete search history.

(56) References Cited

U.S. PATENT DOCUMENTS

| 4,921,232 | A | 5/1990 | Hofmann | |
| 2002/0070489 | A1* | 6/2002 | Tanaka | F16F 13/10 267/140.11 |
| 2002/0180129 | A1 | 12/2002 | Frobisher et al. | |
| 2005/0001364 | A1 | 1/2005 | Visage et al. | |
| 2008/0023897 | A1* | 1/2008 | Muraoka | F16F 13/26 267/140.11 |
| 2015/0054209 | A1* | 2/2015 | Eckel | F16F 13/08 267/140.14 |
| 2015/0123327 | A1* | 5/2015 | Saito | F16F 13/18 267/140.13 |
| 2015/0252866 | A1* | 9/2015 | Muraoka | F16F 13/103 267/140.13 |

FOREIGN PATENT DOCUMENTS

| CN | 203142369 | 8/2013 |
| EP | 1 628 040 | 10/2007 |
| JP | 10-231885 | 9/1998 |
| JP | 2006-170271 | 6/2006 |
| KR | 10-0918360 | 9/2009 |

* cited by examiner

*Primary Examiner* — Christopher P Schwartz
(74) *Attorney, Agent, or Firm* — Mintz Levin Cohn Ferris Glovsky and Popeo, P.C.; Peter F. Corless

(57) ABSTRACT

An engine mount for a vehicle includes: a core which is made of a plastic material and attached to an outer circumferential surface at a lower end of a main rubber body; and a cover which is coupled to the core to close a lower opening of a bracket, in which the core and the bracket are assembled by coupling the core and the cover and then inserting a hook formed on the core into a groove formed in an inner wall surface of a body of the bracket.

5 Claims, 9 Drawing Sheets

(a)

(b)

ENGINE MOUNT HAVING BRACKET COUPLING HOOK

CROSS-REFERENCE TO RELATED APPLICATION

This application claims under 35 U.S.C. § 119 the benefit of Korean Patent Application No. 10-2017-0112010, filed on Sep. 1, 2017 with the Korean Intellectual Property Office, the entire contents of which are incorporated herein by reference.

BACKGROUND

1. Technical Field

The present disclosure relates to an engine mount for a vehicle, and more particularly, to an engine mount having a bracket coupling hook made of plastic.

2. Description of the Related Art

In general, a reduction in weight of a vehicle is an important factor in designing the vehicle, and the weight reduction is not only related directly to an improvement in fuel economy, but also related to a collision performance and assembly durability of the vehicle.

Recently, even in the field of an engine mount for fixing an engine to a vehicle body of a vehicle, developments include utilizing an aluminum or plastic material instead of steel in order to reduce a weight of the mount.

In this case, an important design factor for implementing a mount made of a plastic material is the assembly durability of the mount. Because plastic is more disadvantageous in terms of strength and tolerance than steel or aluminum, a part made of plastic must be securely assembled.

For example, there has been proposed a technology in which a cover, which covers a lower part of the mount on which components such as a nozzle plate and a diaphragm are installed, is made of a plastic material, and the cover and a body of the mount are coupled by forming a latch (hook) and a fastening portion to ensure the assembly durability. In this case, a lower portion of a main rubber body (a rubber part of the mount) to which the latch is fastened is curled and finished with an aluminum material having a high elongation percentage in order to ensure the assembly durability.

However, an aluminum material having a high elongation percentage is comparatively expensive and disadvantageous due to low strength or rigidity, and an aluminum material having a low elongation percentage has high strength or rigidity, but has a problem in that a crack may be formed in the curled portion of the main rubber body because of the low elongation percentage, which increases a defect rate.

Hence, there has also been proposed a technology in which a bracket, which has a body that is made of an aluminum material and has an inner wall surface processed to mesh with a lower portion of a main rubber body, is forcibly press-fitted with an outer portion of the main rubber body such that the lower portion of the main rubber body and the inner wall surface of the bracket are forcibly press-fitted with each other.

This technology is advantageous in improving rigidity and reducing costs because it is not necessary to use an aluminum material having a high elongation percentage, but increased processing costs are required to cast the bracket because the body itself is made of the aluminum material, and there is a concern that a crack may be formed in the processed surface and fatigue strength of the bracket may deteriorate as a continuous and excessive load is applied to an outer portion of the bracket since the bracket made of aluminum is forcibly press-fitted.

SUMMARY

The present disclosure provides an engine mount having a bracket coupling hook, which is capable of achieving a reduction in weight of the mount by use of a plastic material, ensuring assembly durability, improving productivity, reducing costs, and preventing the occurrence of a crack or deterioration in strength of a bracket caused by fatigue strength.

An exemplary embodiment of the present disclosure provides an engine mount for a vehicle, including: a core which is made of a plastic material and attached to an outer circumferential surface at a lower end of a main rubber body; and a cover which is coupled to the core to close a lower opening of a bracket, in which the core and the bracket are assembled by coupling the core and the cover and then inserting a hook formed on the core into a groove formed in an inner wall surface of a body of the bracket.

The engine mount having a bracket coupling hook, which has the aforementioned configuration, has the following effects.

First, an advantage of the present disclosure is that the core, which covers the main rubber body, is made of a plastic material, and as a result, it is possible to reduce fuel consumption and costs by reducing a weight of the engine mount.

Second, an advantage of the present disclosure is that the engine mount is completely assembled by inserting the plurality of hooks formed on the core into the groove formed in the inner wall surface of the bracket, and as a result, it is possible to ensure assembly durability and improve productivity.

Third, according to the present disclosure, it is possible to prevent the occurrence of a crack in a curled portion because it is not necessary to curl the core with an aluminum material unlike the related art, and it is possible to prevent damage to the bracket caused by deterioration in strength because the assembly is performed by fastening the hook and thus an excessive load is not applied to the bracket.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a configuration of an engine mount having a bracket coupling hook according to the present disclosure will be described in detail with reference to the drawings.

Figure 1:
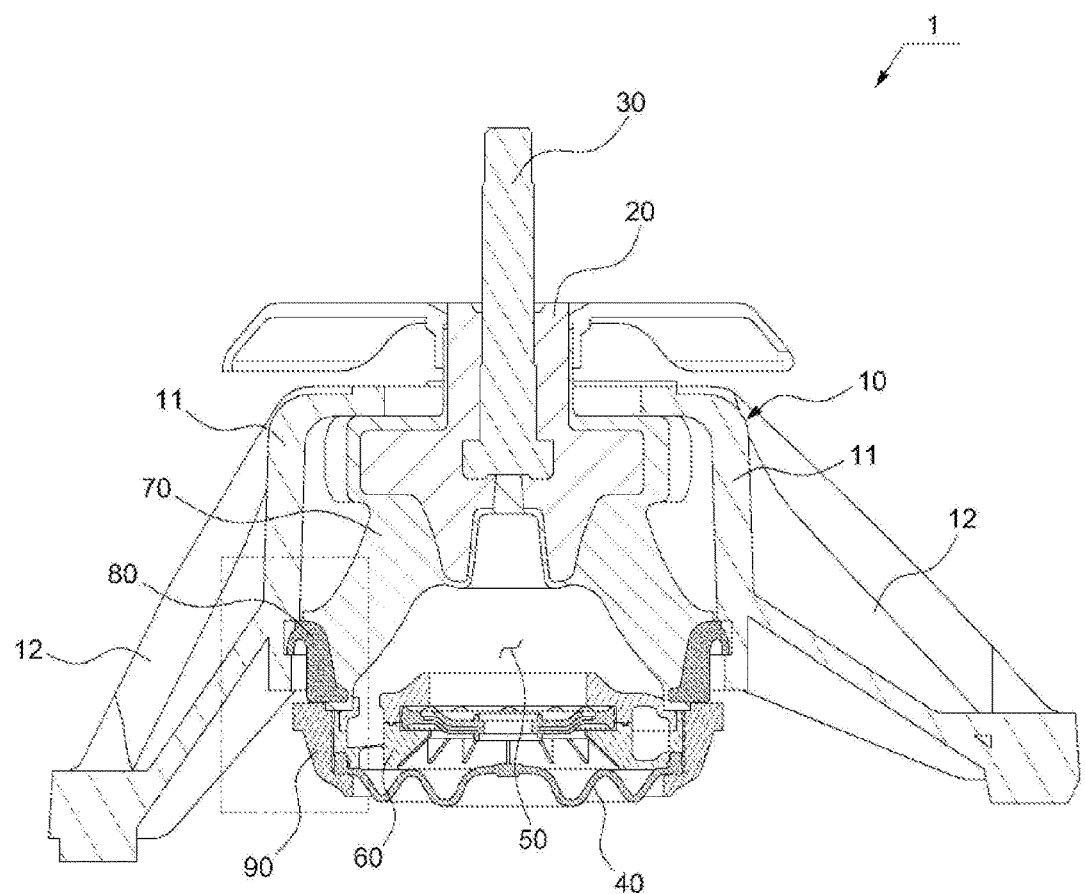
FIG. 1 is a front cross-sectional view of an engine mount of the present disclosure.

FIG. 1 is a front cross-sectional view of an engine mount of the present disclosure.

In general, when high-frequency vibration with low amplitude or low-frequency vibration with high amplitude is generated in an engine while a vehicle travels, the vibration is transmitted to an engine mount, the engine mount serves to attenuate vibration energy of the engine as a fluid encapsulated in the engine mount repeatedly flows upward or downward along a nozzle plate in an internal space of the engine mount while a main rubber body installed in the engine mount is compressed and restored.

Therefore, an engine mount 1 of the present disclosure has constituent elements for performing the aforementioned basic operation of the engine mount. That is, the engine mount 1 of the present disclosure includes a bracket 10 which has a body 11 and a bridge 12 that extends from the body 11 and is fixed to a vehicle body, a bolt fixing unit 20 which is installed at an upper side in the bracket 10, a bolt 30 which protrudes upward from the bolt fixing unit 20 and is fastened to an engine, a main rubber body 70 which is coupled at a lower side of the bolt fixing unit 20, a main liquid chamber 50 which is formed at a lower side of the main rubber body 70 and defines a space in which a fluid flows, a nozzle plate 60 which defines a passageway through which the fluid accommodated in the main liquid chamber 50 repeatedly flows upward or downward, a diaphragm 40 which is made of an elastic material and coupled at a lower side of the nozzle plate 60, a core 80 which is attached to an outer circumferential surface at a lower end of the main rubber body 70, and a cover 90 which accommodates the nozzle plate 60 and the diaphragm 40 and is coupled to the core 80 to close a lower opening of the bracket 10.

Figure 2:
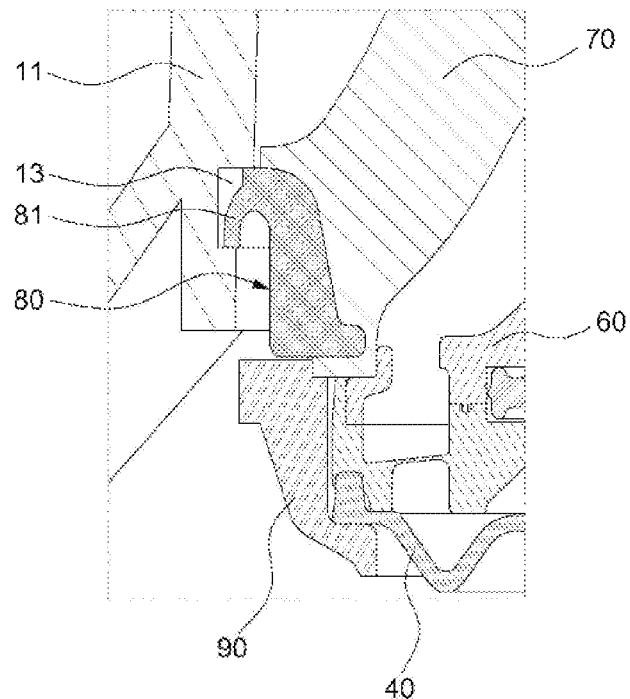
FIGS. 2 and 3 are detailed cross-sectional views illustrating a state in which a core of the engine mount of the present disclosure is coupled.
Figure 3:
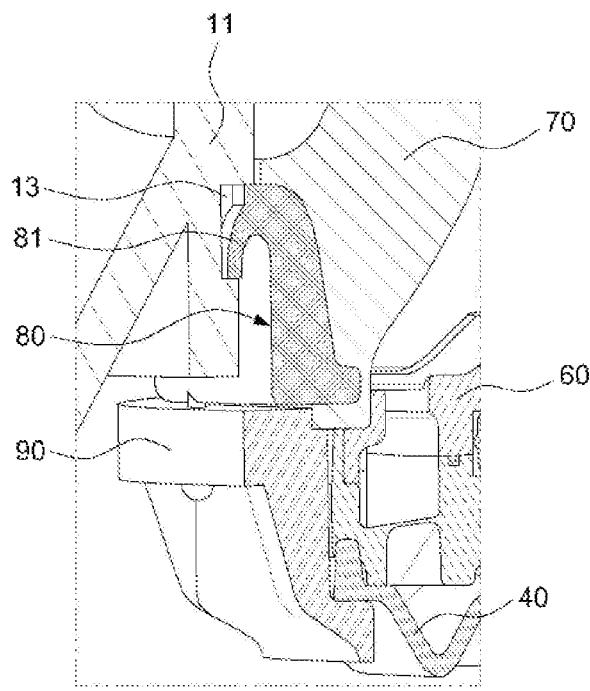

As illustrated in FIGS. 2 and 3, the engine mount of the present disclosure is assembled by coupling hooks 81 of the core 80 to a groove 13 formed in an inner wall surface of the body 11 of the bracket 10 in a state in which the core 80 coupled to the main rubber body 70 is coupled to the cover 90. The process of coupling the core 80 and the cover 90 will be described below in detail.

Figure 4:
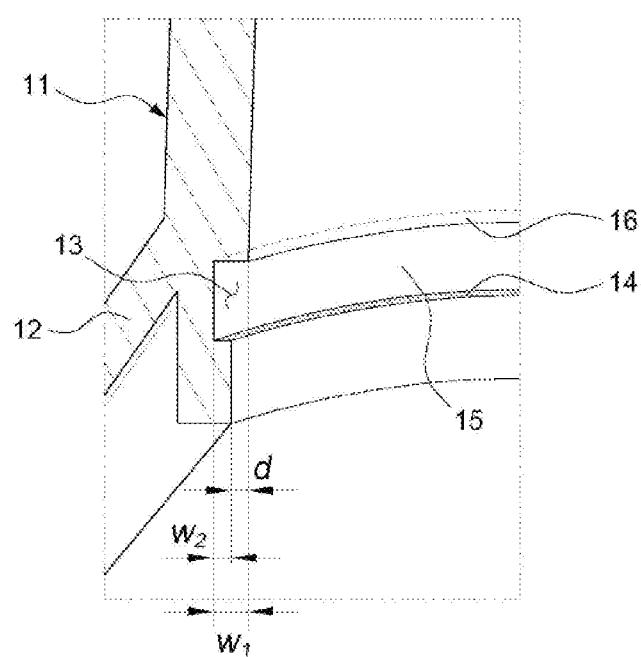
FIG. 4 is a detailed cross-sectional view of a groove of a body of a bracket of the engine mount of the present disclosure.
Figure 5:
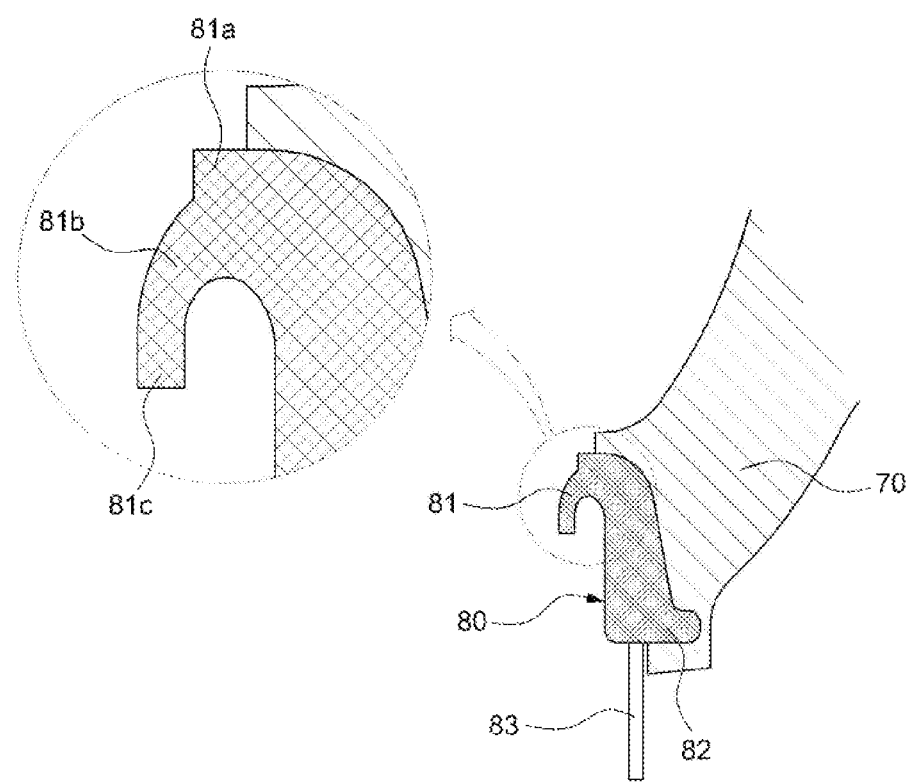
FIG. 5 is a detailed cross-sectional view of a hook of the engine mount of the present disclosure.

FIG. 4 is a detailed cross-sectional view of the groove of the body of the bracket of the engine mount of the present disclosure, and FIG. 5 is a detailed cross-sectional view of the hook of the engine mount of the present disclosure.

First, referring to FIG. 4, the groove 13 having a predetermined height is formed along the inner wall surface of the body 11 of the bracket 10 in order to couple the core 80 and the cover 90.

The groove 13 has a groove bottom surface 14, a groove wall surface 15, and a groove ceiling surface 16, and the surface of the groove 13 is processed to be stepped so that a difference between a width $w_1$ of the groove ceiling surface 16 and a width $w_2$ of the groove bottom surface 14 is a predetermined length d based on the wall surface 15 of the groove 13.

Referring to FIG. 5, the core 80 attached to the outer circumferential surface at the lower end of the main rubber body 70 is a doughnut shaped member (see FIG. 7), and has a body 85 formed at a lower side thereof and a flange 84 formed at an upper side of the body 85, and the plurality of hooks 81 protrudes along an outer circumferential surface of the flange 84.

The hook 81 is formed at an upper side of a base 82 that defines a support surface of the body 85, and the hook 81 has a head 81a which is formed at an uppermost end, an intermediate portion 81b which extends from the head 81a so as to be inclined forward, and an end 81c which extends downward from the intermediate portion 81b to define an end portion.

In this case, the hook 81 has pins 83 which vertically protrude and extend downward from a lower side of the base 82. A length $h_1$ of the pin 83 is at least greater than a height $h_2$ of a rim surface 91 of the cover 90 so that the pin 83 is fused as described below.

Meanwhile, the core 80 configured as described above is made of a plastic material in order to reduce a weight of the engine mount.

Figure 7:
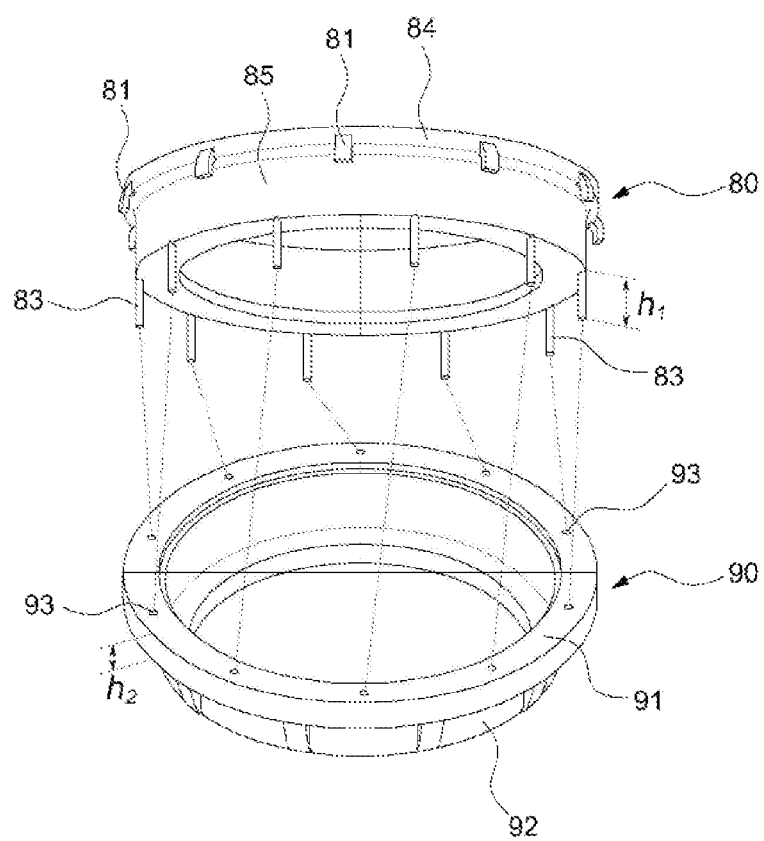
FIG. 7 is a perspective view illustrating a state in which a core and a cover of the engine mount of the present disclosure are coupled.

Referring to FIG. 7, the cover 90 has the rim surface 91 formed at an upper side of the body 92, and a plurality of holes 93 into which the pins 83 of the core 80 are inserted is formed in the rim surface 91.

Hereinafter, a process of assembling the engine mount of the present disclosure, which is configured as described above, will be described in detail.

Figure 6:
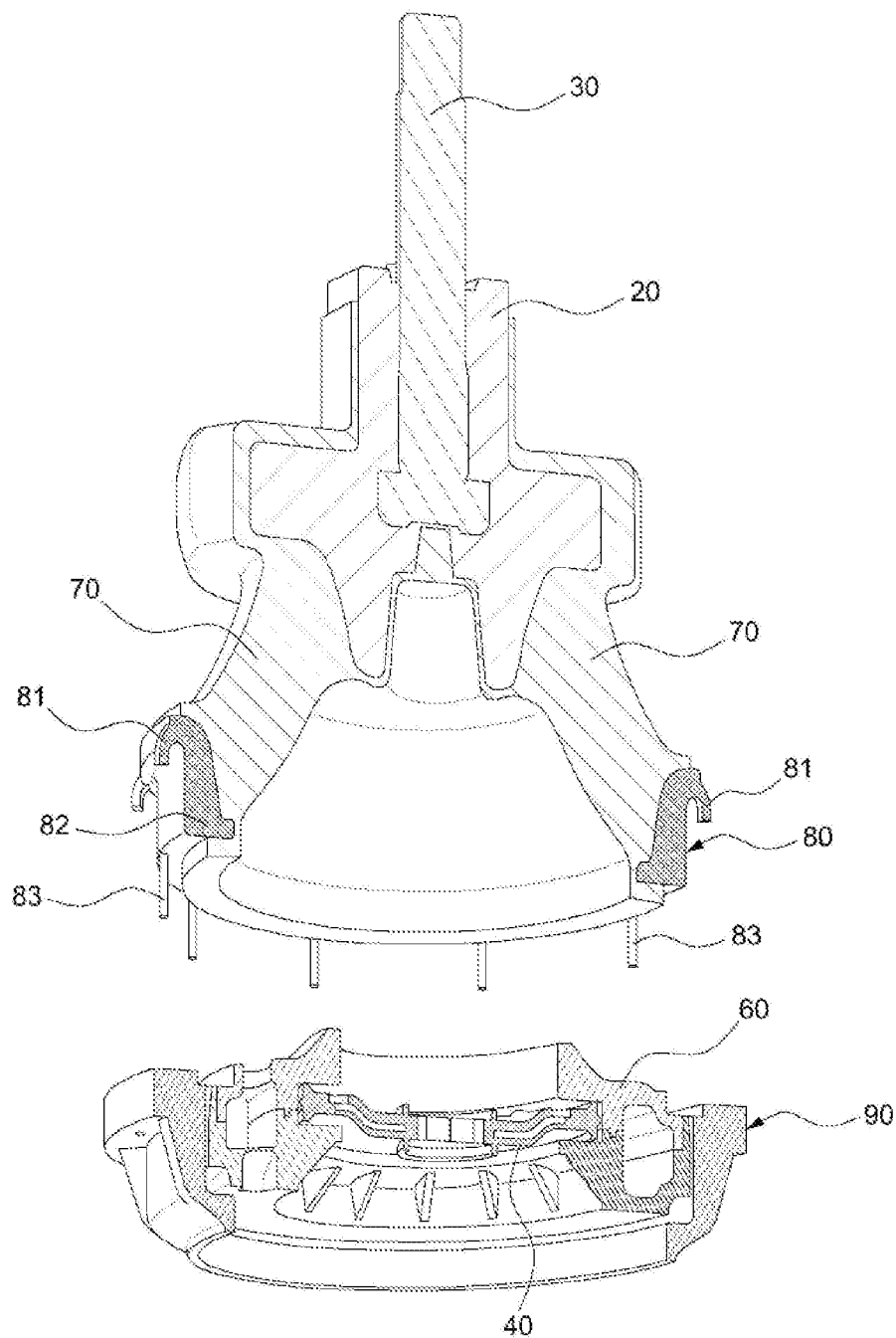
FIG. 6 is an exploded perspective view of the engine mount of the present disclosure.
Figure 8:
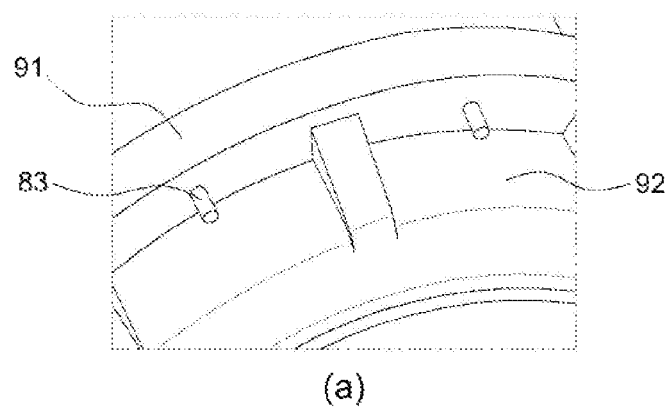
FIG. 8 is a view illustrating a state in which pins are fused in a state in which the core and the cover of the engine mount of the present disclosure are coupled.
Figure 8:
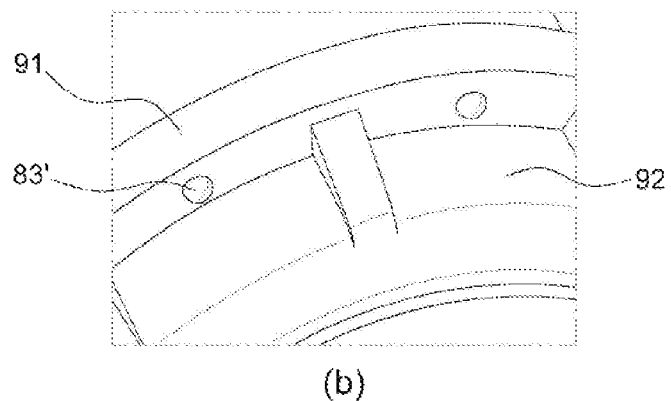

FIG. 6 is an exploded perspective view of the engine mount of the present disclosure, FIG. 7 is a perspective view illustrating a state in which the core and the cover of the engine mount of the present disclosure are coupled, and FIG. 8 is a view illustrating a state in which the pins are fused in a state in which the core and the cover of the engine mount of the present disclosure are coupled.

Referring to FIG. 6, in the engine mount of the present disclosure, the core 80 attached to the outer circumferential surface at the lower end of the main rubber body 70 coupled at the lower side of the bolt fixing unit 20 is coupled, first, to the cover 90 that accommodates the nozzle plate 60 and the diaphragm 40.

That is, as illustrated in FIG. 7, the core 80 and the cover 90 are coupled to each other by inserting the pins 83 of the core 80 into the holes 93 formed in the rim surface 91 of the cover 90 when coupling the core 80 and the cover 90.

In this case, as illustrated in the upper side (a) of FIG. 8, an end of the pin 83 penetrates the hole 93 and is exposed to the outside because the length $h_1$ of the pin 83 is greater than the height $h_2$ of the rim surface 91 of the cover 90 in the state in which the core 80 and the cover 90 are coupled to each other.

In this case, as illustrated in the lower side (b) of FIG. 8, the pin 83 of the core 80 is fused into a lower portion of the rim surface 91 of the cover 90 by melting the end of the pin 83, which penetrates the hole 93 and is exposed to the outside, by using a heat generator, and as the pin 83 is fused as described above, it is possible to further encapsulate the fluid that flows in the main liquid chamber 40 and along the nozzle plate 60.

In the exemplary embodiment of the present disclosure, a typical ultrasonic wave generator is used as the heat generator for fusing the pin 83, and the fluid is injected into the main liquid chamber 50 by a typical dry filling method.

Next, the core 80 is attached to the main rubber body 70 as described above, and the bracket 10 is coupled at the upper side of the main rubber body 70 in the state in which the cover 90 is coupled at the lower side of the core 80.

Figure 9:
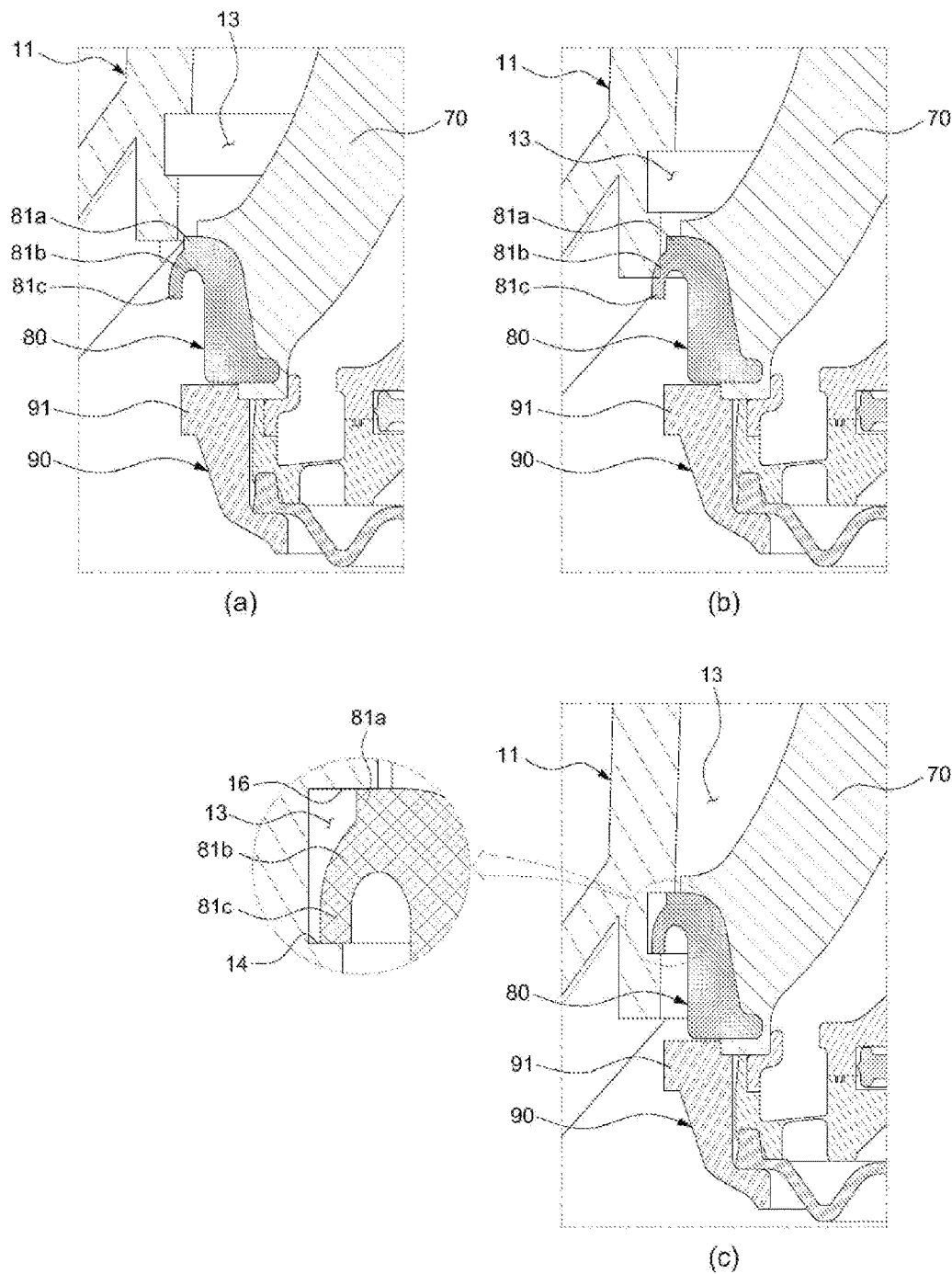
FIG. 9 is a cross-sectional view illustrating a process of coupling the core and the bracket of the engine mount of the present disclosure.

FIG. 9 is a cross-sectional view illustrating a process of coupling the core and the bracket of the engine mount of the present disclosure, and first, as illustrated in the upper side (a), the bracket 10 is moved from the upper side to the lower side of the main rubber body 70, such that the head 81a of the hook 81 of the core 80 attached to the main rubber body 70 comes into contact with a lower end of the groove 13 of the bracket 10, and the hook 81 is moved upward toward the groove 13 while the head 81a is pushed rearward by elasticity of the hook 81.

When the bracket 10 is further moved downward in this state, the hook 81 is moved upward toward the groove 13 while the intermediate portion 81b is also pushed rearward subsequent to the head 81a of the hook 81, and thereafter, when the bracket 10 is moved downward again, the head 81a of the hook 81 comes into contact with the ceiling surface 16 of the groove 13 while entering the groove 13 in the inner wall surface of the bracket 10, and the end 81c of the hook 81 is spread leftward and rightward while coming into contact with the bottom surface 14 of the groove 13, such that the entire body of the hook 81 is inserted into the groove 13.

Since the plurality of hooks 81 is fastened along the outer circumferential surface of the core 80, the bracket 10 and the core 80 may be securely coupled to each other by the hooks 81, and the bracket 10 may support a load in an up and down direction since the head 81a, the intermediate portion 81b, and the end 81c of the hook 81 are in close contact with the ceiling surface 16, the wall surface 15, and the bottom surface 14 of the groove 13.

Therefore, according to the present disclosure, the bracket 10 may be simply and easily assembled by the hooks 81 as described above, and as a result, productivity may be improved and excellent durability of the assembly may be obtained.

With the application of the structure in which the hooks 81 are inserted into the groove 13 formed in the inner wall surface of the bracket 10, an outer diameter of the bracket 10 is minimized such that a larger space for accommodating the engine mount may be ensured in a space of an engine room in the vehicle, and a position at which the engine mount is mounted may be lowered by using the ensured space. Since the position at which the engine mount is mounted is lowered, costs may be reduced and a vibration damping performance may be improved by the design change.

Figure 10:
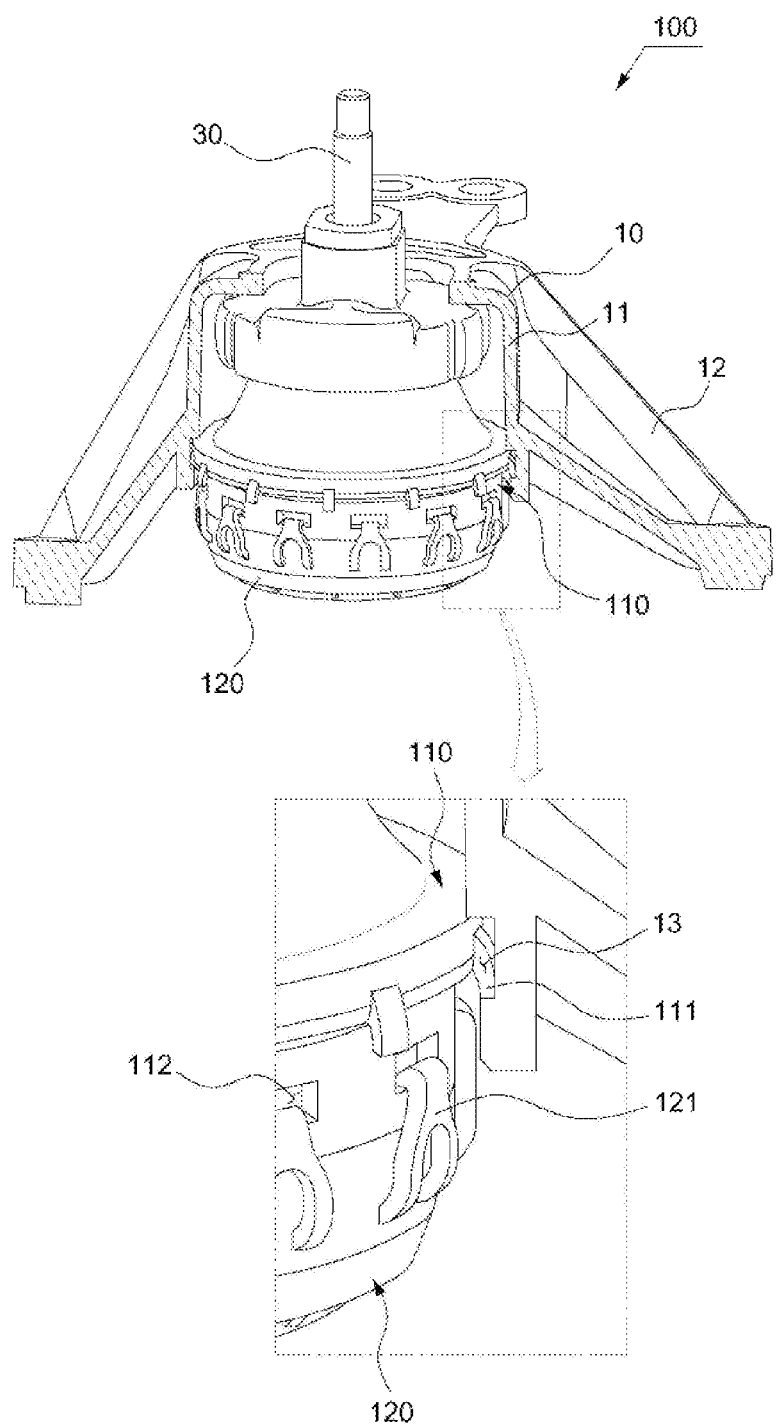
FIG. 10 is a perspective view of an engine mount according to another exemplary embodiment of the present disclosure.

FIG. 10 is a perspective view of an engine mount 100 according to another exemplary embodiment of the present disclosure, and illustrates an exemplary embodiment in which a core 110 and a cover 120 are coupled to each other as a plurality of latches 121 formed on the cover 120 is fastened to coupling grooves 112 formed in the core 110.

A configuration of hooks 111 formed on the core 110 of the engine mount 100 according to another exemplary embodiment of the present disclosure is identical to that of the hooks 81 formed on the core 80 according to the aforementioned exemplary embodiment, and the same process according to the aforementioned exemplary embodiment applies to the process of coupling the core 110 to the bracket 10 by inserting the hooks 111 of the core 110 into the groove 13 formed in the inner wall surface of the bracket 10, and as a result, detailed descriptions thereof will be omitted.

Although the preferred embodiments of the present disclosure has been disclosed for illustrative purposes, those skilled in the art will appreciate that various modifications can be made without departing from the scope and spirit of the disclosure.

What is claimed is:

1. An engine mount for a vehicle, which includes a bracket having a body and a bridge, a main rubber body, a nozzle plate, and a diaphragm, the engine mount comprising:
    a core which is made of a plastic material and attached to an outer circumferential surface at a lower end of the main rubber body;
    a cover which accommodates the nozzle plate and the diaphragm and is coupled to the core to close a lower opening of the bracket; and
    a hook which is formed on the core,
    wherein the hook is inserted into a groove formed in an inner wall surface of the body of the bracket to assemble the core and the bracket, and
    wherein the core has a body formed at a lower side thereof and a flange formed at an upper side of the body, the plurality of hooks protrudes along an outer circumferential surface of the flange, and the hooks have pins that extend downward vertically at a lower side of the hooks.

2. The engine mount of claim 1, wherein the cover has a rim surface formed at an upper side of the body, and a plurality of holes into which the pins of the core are inserted is formed in the rim surface.

3. The engine mount of claim 2, wherein an end of the pin, which penetrates the hole and is exposed to a lower side of the rim surface, is fused by using a heat generator.

4. The engine mount of claim 1, wherein the groove has a groove bottom surface, a groove wall surface, and a groove ceiling surface, and wherein the groove is stepped so that a difference between a width of the groove ceiling surface and a width of the groove bottom surface is a predetermined length.

5. The engine mount of claim 1, wherein the core and the cover are coupled to each other as a plurality of latches formed on the cover is fastened to a plurality of coupling grooves formed in the core.

* * * * *